(12) United States Patent
Naidu et al.

(10) Patent No.: US 9,098,101 B2
(45) Date of Patent: Aug. 4, 2015

(54) SUPPLY NOISE CURRENT CONTROL CIRCUIT IN BYPASS MODE

(71) Applicants: Prasad Naidu, Bangalore (IN); Deepak Pancholi, Bangalore (IN)

(72) Inventors: Prasad Naidu, Bangalore (IN); Deepak Pancholi, Bangalore (IN)

(73) Assignee: SanDisk Technologies Inc., Plano, TX (US)

( * ) Notice: Subject to any disclaimer, the term of this patent is extended or adjusted under 35 U.S.C. 154(b) by 0 days.

(21) Appl. No.: 13/772,865

(22) Filed: Feb. 21, 2013

(65) Prior Publication Data

US 2014/0103890 A1    Apr. 17, 2014

(30) Foreign Application Priority Data

Oct. 16, 2012    (IN) ............................ 4318/CHE/2012

(51) Int. Cl.
*G05F 1/00* (2006.01)
*G05F 1/10* (2006.01)
*G05F 3/02* (2006.01)

(52) U.S. Cl.
CPC ........................................ *G05F 1/10* (2013.01)

(58) Field of Classification Search
CPC ............. G05F 1/10; G05F 1/461; G05F 1/56; G05F 1/561; G05F 1/562; G05F 1/571; G05F 3/02; G05F 3/08; G05F 3/16; G05F 3/24; G05F 3/26; G05F 3/262–3/267; G05F 1/46; G05F 1/565; G05F 1/59; G11C 11/4072; G11C 11/4074; G11C 5/14; G11C 5/147; G11C 7/00; G11C 7/20; G06F 1/26; G06F 1/28; G06F 1/30; H02M 3/156; H02M 3/158; H02M 3/1584; H02M 3/1586; H02M 2001/0045
USPC ......... 323/222–226, 266, 268–277, 311–317, 323/351, 908, 281–285, 901; 327/538–543; 361/18, 91, 54–57, 93.1–102, 111; 365/189.09, 226; 713/300–340
See application file for complete search history.

(56) References Cited

U.S. PATENT DOCUMENTS

| | | | | |
|---|---|---|---|---|
| 5,373,477 | A * | 12/1994 | Sugibayashi | 365/226 |
| 5,881,014 | A * | 3/1999 | Ooishi | 365/226 |
| 6,529,437 | B2 * | 3/2003 | Kono | 365/226 |
| 6,897,638 | B2 | 5/2005 | Miyanaga et al. | |
| 7,212,067 | B2 * | 5/2007 | Pasternak | 327/541 |
| 7,391,193 | B2 | 6/2008 | Wang et al. | |
| 2006/0145673 | A1 | 7/2006 | Fogg et al. | |
| 2010/0277148 | A1 | 11/2010 | Zhao et al. | |

FOREIGN PATENT DOCUMENTS

WO    WO 2006/081283 A2    8/2006

* cited by examiner

*Primary Examiner* — Timothy J Dole
*Assistant Examiner* — Carlos Rivera-Perez
(74) *Attorney, Agent, or Firm* — Brinks Gilson & Lione

(57) ABSTRACT

A proposed inrush control circuit may work in the presence of supply noise. A linear regulator in bypass mode may be designed for inrush current control, but may be susceptible to irregularities from increased supply noise. The circuit may include a splitting of the bypass power MOS that are switched on with some delay during the power on to control the initial power-on inrush current.

20 Claims, 9 Drawing Sheets

SUPPLY NOISE CURRENT CONTROL CIRCUIT IN BYPASS MODE

PRIORITY CLAIM

This application claims priority to India Patent Application 4318/CHE/2012 filed on Oct. 16, 2012, entitled "SUPPLY NOISE CURRENT CONTROL CIRCUIT IN BYPASS MODE," the entire disclosure of which is hereby incorporated by reference.

TECHNICAL FIELD

This application relates generally to inrush current control circuits. More specifically, this application relates to an inrush current control circuit that operates despite increased supply noise.

BACKGROUND

Advances in integrated circuit (IC) technologies have resulted in decreasing the size and operating voltages of devices used to fabricate circuitry. In battery operated devices, such as cellular phones, smartphones, tablets, and laptop computers, low-voltage integrated circuits allow the devices to operate proportionally longer than devices requiring higher voltage for operation. The lower supply voltages of the latest standards (e.g. USB3.0, SATA3.0, PCIe3 etc) may not always be compatible with legacy host device interfaces but new interfaces are typically backwards compatible. For example, old standard hosts provide higher supply voltage than new standards. The latest computer peripheral devices may therefore be designed to accommodate connections from newer, lower voltage host supplies as well as older, higher voltage supplies. Devices constructed with newer technologies therefore must allow for the possibility that the host device in which they are used may supply a higher voltage with legacy products. In order to couple systems manufactured with newer interface standard technologies to legacy interface standard hosts that provide higher-supply voltages, voltage regulation may be used to provide the correct voltage. However, due to smaller package and board sizes of the battery operated devices, the trace or bond-wire parasitic may be higher which can result in large supply noise.

SUMMARY

It may be desirable to have a control circuit that controls power-on inrush current and also operates despite large supply noise. For example, a linear regulator in bypass mode may be designed for inrush current control, but may be susceptible to irregularities from increased supply noise. The circuit described below may include a splitting of the bypass power MOS that are switched on with some delay during the power-on to control the initial power-on inrush current.

BRIEF DESCRIPTION OF THE PRESENTLY PREFERRED EMBODIMENTS

By way of introduction, a circuit, according to the embodiments described below, controls inrush current in the presence of supply noise from a linear regulator in bypass mode. The circuit may regulate voltage for operating a device coupled to a host when the host supply exceeds that necessary device operation, and a bypass mode, allowing the supply to pass to the device directly when the supply voltage is correct to power the device. The circuit may be implemented with transistors or other devices which are designed to operate at various voltage levels which may depend on the host. The circuit should prevent high host supply voltages, including an inrush current, from damaging the circuit or host.

Inrush current may be referred to as a switch-on current or surge and may include the instantaneous input current drawn by an electrical device when first turned on. The inrush current may be a large surge in current that is greater than the normal load the circuit is designed for. Regulation of the inrush current must not interrupt the circuit function while tolerating the overload. Inrush current control or limiters may handle the inrush current while avoiding damage to components without tripping the supply's fuse or circuit breaker.

Supply noise may be a problem in certain devices, including flash memory cards. Bypass mode regulators may include inrush current control for regulating voltage. However, the inrush current control loop may start oscillating under large supply noise. As described below, the circuits need to withstand large noise on the supply and properly control the inrush current in the system while avoiding the oscillation caused under large supply noise.

Figure 1:
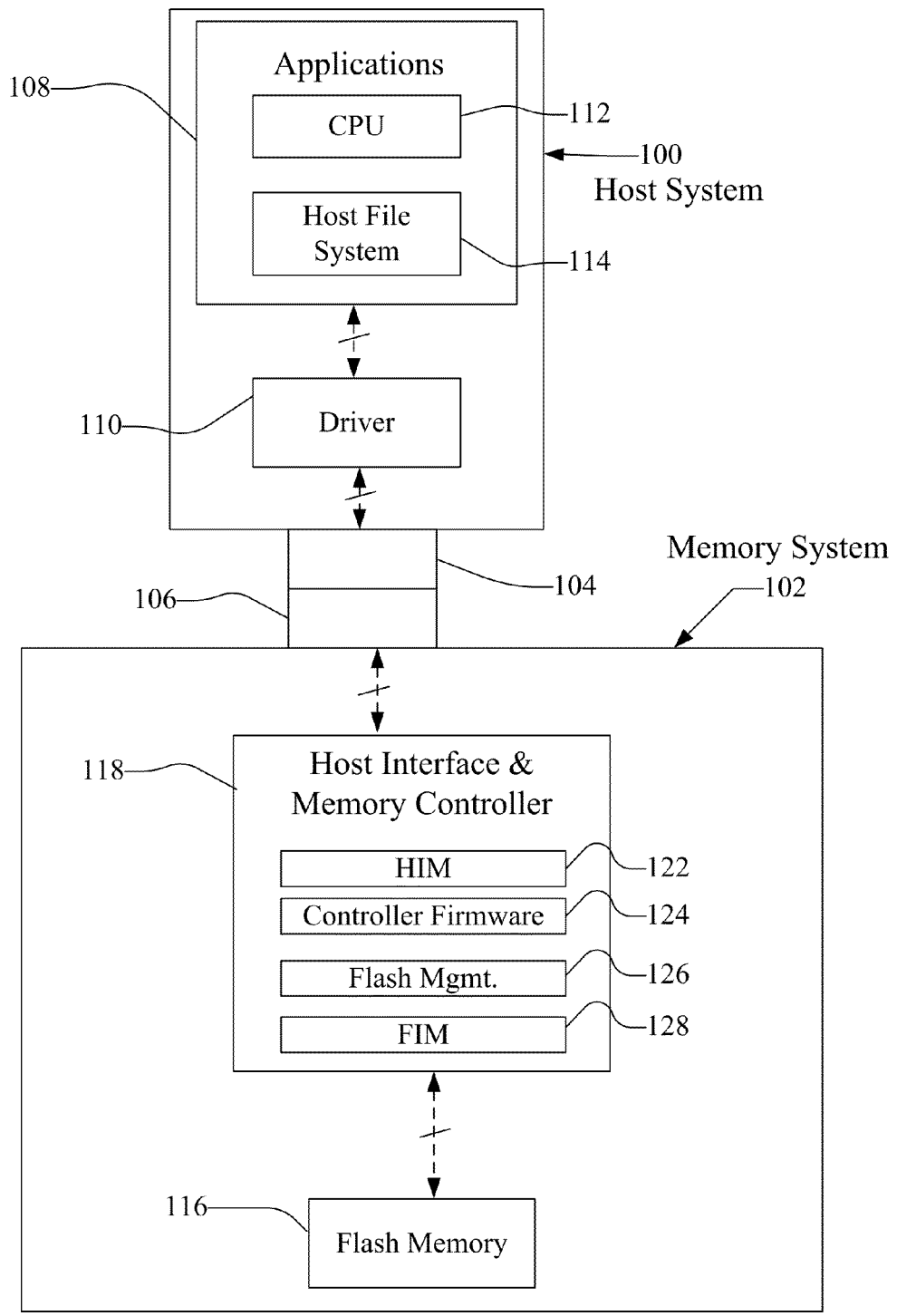
FIG. 1 is a block diagram of a host connected with a memory system having non-volatile memory.
Figure 2:
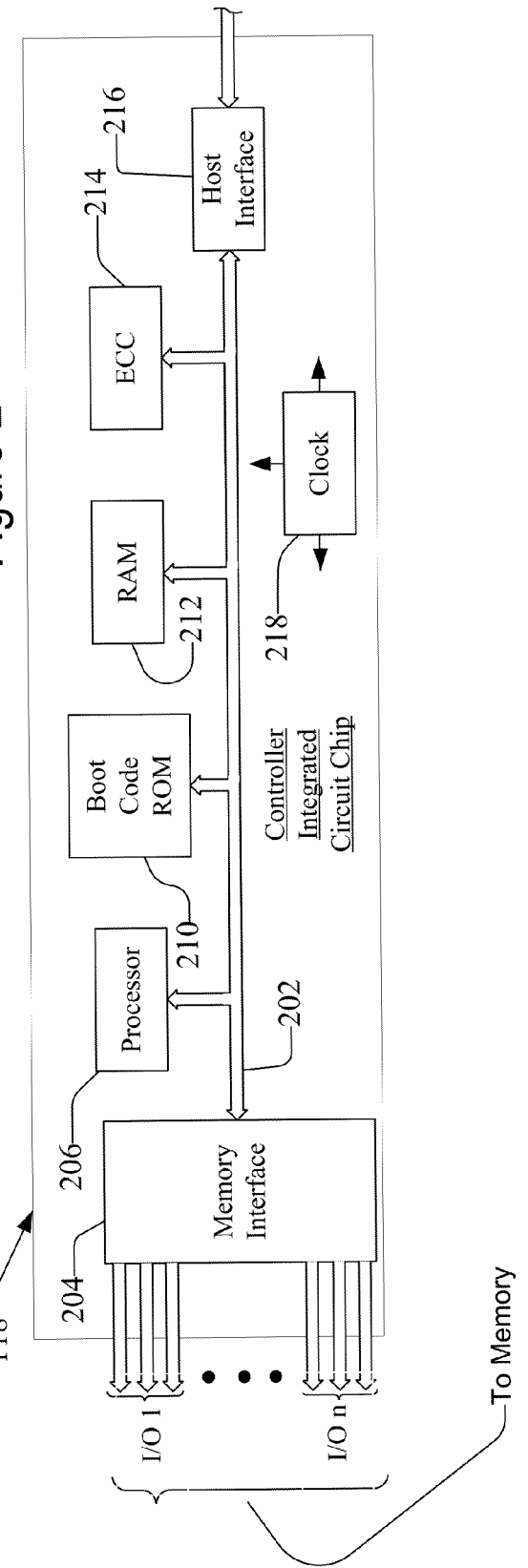
FIG. 2 is a block diagram of an exemplary flash memory system controller for use in the system of FIG. 1.

In one example, the circuit may be suitable for use with a non-volatile memory system as illustrated in FIGS. 1-2. However, the circuit may also apply to a number of different environments and uses other than the memory system illustrated in FIGS. 1-2. The system may be utilized with any number of types of host devices including cellular telephones, smartphones, digital cameras, personal digital assistants, mobile computing devices, tablets, laptops, netbooks, non-mobile computing devices, audio/mp3 players, video players, and other devices.

Non-volatile memory is one example of a device that may utilize voltage regulation. FIGS. 1-2 illustrate a flash memory system that may utilize the inrush current control circuit described below. The circuit may be implemented in different embodiments, environments, and devices and a flash memory system is merely one example of how the inrush current control circuit may be utilized. A host system 100 of FIG. 1 stores data into and retrieves data from a flash memory 102. The flash memory may be embedded within the host, such as in the form of a solid state disk (SSD) drive installed in a personal computer. Alternatively, the memory 102 may be in the form of a flash memory card that is removably connected to the host through mating parts 104 and 106 of a mechanical and electrical connector as illustrated in FIG. 1. A flash memory configured for use as an internal or embedded SSD drive may look similar to the schematic of FIG. 1, with one difference being the location of the memory system 102 internal to the host. SSD drives may be in the form of discrete modules that are drop-in replacements for rotating magnetic disk drives.

Examples of commercially available removable flash memory cards include the CompactFlash (CF), the MultiMediaCard (MMC), Secure Digital (SD), miniSD, Memory Stick, SmartMedia, TransFlash, and microSD cards. Although each of these cards may have a unique mechanical and/or electrical interface according to its standardized specifications, the flash memory system included in each may be similar. These cards are all available from SanDisk Corporation, assignee of the present application. SanDisk also provides a line of flash drives under its Cruzer trademark, which are hand held memory systems in small packages that have a Universal Serial Bus (USB) plug for connecting with a host by plugging into the host's USB receptacle. Each of these memory cards and flash drives includes controllers that interface with the host and control operation of the flash memory within them.

Host systems that may use SSDs, memory cards and flash drives are many and varied. They include personal computers (PCs), such as desktop or laptop and other portable computers, tablet computers, cellular telephones, smartphones, personal digital assistants (PDAs), digital still cameras, digital movie cameras, and portable media players. For portable memory card applications, a host may include a built-in receptacle for one or more types of memory cards or flash drives, or a host may require adapters into which a memory card is plugged. The memory system may include its own memory controller and drivers but there may also be some memory-only systems that are instead controlled by software executed by the host to which the memory is connected. In some memory systems containing the controller, especially those embedded within a host, the memory, controller and drivers are often formed on a single integrated circuit chip. The host may communicate with the memory card using any communication protocol such as but not limited to Secure Digital (SD) protocol, Memory Stick (MS) protocol and Universal Serial Bus (USB) protocol.

The host system 100 of FIG. 1 may be viewed as having two major parts, insofar as the memory 102 is concerned, made up of a combination of circuitry and software. They are an applications portion 108 and a driver portion 110 that interfaces with the memory 102. There may be a central processing unit (CPU) 112 implemented in circuitry and a host file system 114 implemented in hardware or software. In a PC, for example, the applications portion 108 may include a processor 112 running word processing, graphics, control or other popular application software. In a camera, cellular telephone or other host system 100 that is primarily dedicated to performing a single set of functions, the applications portion 108 includes the software that operates the camera to take and store pictures, the cellular telephone to make and receive calls, and the like.

The memory system 102 of FIG. 1 may include non-volatile memory, such as flash memory 116, and a system controller 118 that both interfaces with the host 100 to which the memory system 102 is connected for passing data back and forth and controls the memory 116. The system controller 118 may convert between logical addresses of data used by the host 100 and physical addresses of the flash memory 116 during data programming and reading. Functionally, the system controller 118 may include a Host interface module (HIM) 122 that interfaces with the host system controller logic 110, and controller firmware module 124 for coordinating with the host interface module 122, flash interface module 128, and flash management logic 126 for internal memory management operations such as garbage collection, and one or more flash interface modules (FIMs) 128 to provide a communication interface between the controller with the flash memory 116.

The system controller 118 may be implemented on a single integrated circuit chip, such as an application specific integrated circuit (ASIC) such as shown in FIG. 2. The processor 206 of the system controller 118 may be configured as a multi-thread processor capable of communicating via a memory interface 204 having I/O ports for each memory bank in the flash memory 116. The system controller 118 may include an internal clock 218. The processor 206 communicates with an error correction code (ECC) module 214, a RAM buffer 212, a host interface 216, and boot code ROM 210 via an internal data bus 202. The ROM 210 may be used to initialize a memory system 102, such as a flash memory device. The memory system 102 that is initialized may be referred to as a card. The ROM 210 in FIG. 2 may be a region of read only memory whose purpose is to provide boot code to the RAM for processing a program, such as the initialization and booting of the memory system 102. The ROM may be present in the ASIC rather than the flash memory chip.

The circuits described below may include a variety of different transistors including MOS transistors. Metal oxide semiconductor ("MOS") may refer to the physical structure of certain field effect transistors, having a metal gate electrode placed on top of an oxide insulator, which in turn is on top of a semiconductor material. Complementary metal oxide semiconductor ("CMOS") is a technology for constructing integrated circuits. CMOS may be used in a variety of digital logic circuits and may also be used in microprocessors, microcontrollers, static RAM, and memory devices, such as flash drives. CMOS technology may be used for analog circuitry, including image sensors, data converters, and/or transceivers for different types of communication. CMOS circuits may p-type and n-type metal oxide semiconductor field-effect transistors ("MOSFETs") to implement logic gates and other digital circuits found in computing and signal processing equipment. Typical commercial CMOS products may be integrated circuits composed of millions of transistors of both types on silicon. These devices may be referred to as chips, die, or dies. CMOS circuits are used to implement logic gates with p-type and n-type MOSFETs to create paths to the output from either the voltage source or ground. When a path to the output is created from the voltage source, the circuit is said to be pulled up. The other circuit state occurs when a path to output is created from ground and the output pulled down to the ground potential. The devices or transistors used for the circuits below may include N-type metal oxide-semiconductor ("NMOS") or P-type metal oxide-semiconductor ("PMOS"). NMOS logic utilizes n-type metal oxide-semiconductor field effect transistors ("MOSFETs") to implement logic gates and other digital circuits. PMOS logic utilizes p-type MOSFETs to implement logic gates and other digital circuits.

Figure 3:
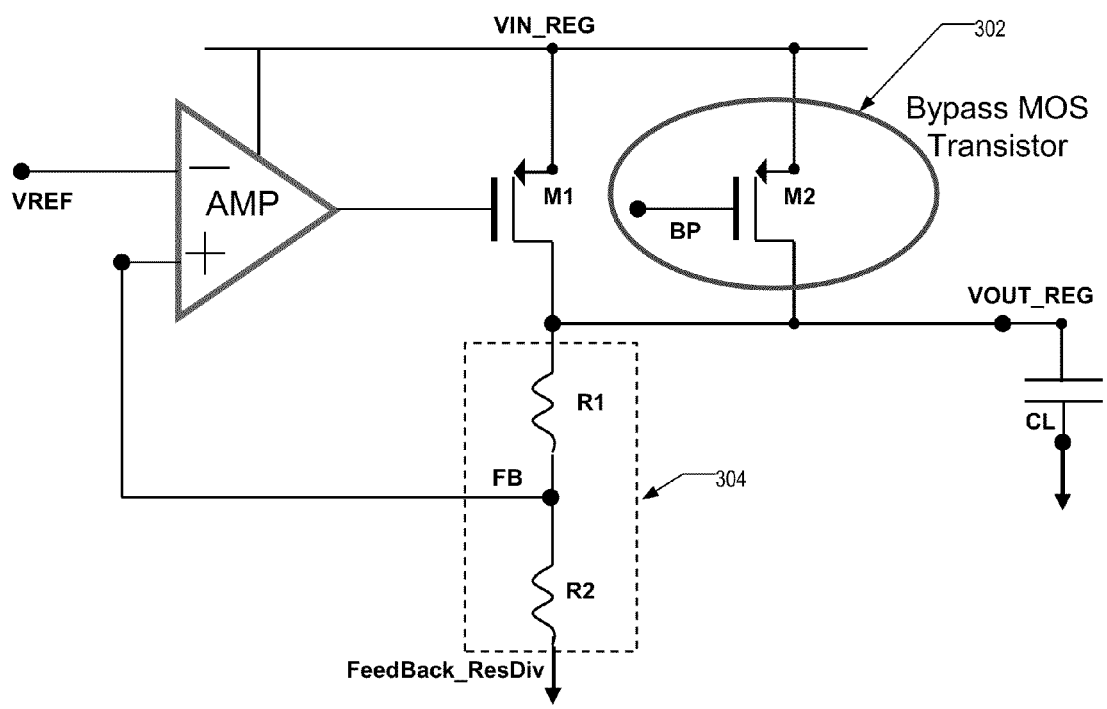
FIG. 3 is a linear regulator circuit with bypass mode.

FIG. 3 is a linear regulator circuit with bypass mode. Bypass mode may allow the circuit to operate with legacy devices at a higher voltage level. The linear regulator circuit may be designed for newer devices (lower voltage levels), but may utilize a bypass mode for compatibility with the legacy devices at a higher voltage level. For example, when a card is utilized with older applications or hosts at higher voltages (e.g. 3.3V), the card will still operate in bypass mode. Conversely, for newer applications or hosts at lower voltages (e.g. 1.8V), the card operates regularly or in regulator mode. In alternative embodiments, the voltages for legacy and new devices may be different. The bypass mode is designed to handle a different set of devices at a different voltage level.

The bypass mode operates using a bypass MOS transistor 302. A voltage regulator may be used to control voltage. A linear regulator may maintain a steady voltage by varying the resistance of the POWER MOS based on the load. A switching regulator may be switched on and off at a fixed rate. Since electronic circuits may be designed to operate from a certain supply voltage that is assumed to be constant, a voltage regulator provides the constant output voltage by continuously holding that voltage regardless of changes in load current or input voltage. FIG. 3 illustrates an exemplary linear regulator with bypass mode. The feedback component 304 includes a feedback node FB and two resistors R1, R2. The feedback component 304 (labeled FeedBack_ResDiv) senses the output voltage and provides a voltage that is the same as one input of the error amplifier which may be equivalent to the reference voltage applied at the other input of error amplifier. If the feedback voltage increases the regulator changes the POWER MOS gate node voltage such that the current at the load is adjusted, as well as the feedback voltages. The feedback is using the output voltage by adjusting the current to keep the output voltage the same.

In many products, two supply output voltage modes may be needed to support the legacy and/or new products/standards. In one example, certain applications may require either of two voltages 3.3 volts ("V") or 1.8V. For example, 3.3V may be needed to supply to legacy application while new standards may require 1.8V or a lower voltage amount. Since future devices may require smaller and smaller voltage amounts, support for several different voltage levels may be necessary. FIG. 3 illustrates an exemplary regulator with a higher voltage input (e.g. 3.3V). When a 3.3V output supply is needed the bypass mode power MOS M2 is active and the regulator is off. In other words, the bypass mode handles the legacy devices (e.g. at a higher voltage, such as 3.3V), while the regulator mode handles newer devices (e.g. at a lower voltage, such as 1.8V). With a 1.8V device requirement at the output node, the bypass power MOS M2 is turned off and the regulator with power MOS M1 is turned on. In some embodiments, the bypass transistor M2 may not used as separate device, and regulator power MOS M1 may work as bypass power MOS with control amplifier "AMP" turned-off.

The regulator may be designed for a certain load current. The regulator may be designed to meet certain specifications below the current limit. If there is a fault and the VOUT_REG attempts to pull a larger current from the transistor M1, then the current should be stopped above the current limit. As described below with respect to FIG. 4, a current control circuit may be utilized to control increased currents. In particular, this current limit functionality should work during bypass mode. There may be other circuits to provide the current limit in regulation mode.

System on a chip ("SoC") may be more common and requires power management inside the SoC. In one embodiment, power island switches (not shown) may be used to conserve and control power in a chip. In one example, a power island switch may provide power to certain blocks when they are functional and be used to reduce leakage and/or to control the inrush current. To avoid a sudden surge in a power island switch, an inrush current control/limit circuit may be added to the bypass devices.

Figure 4:
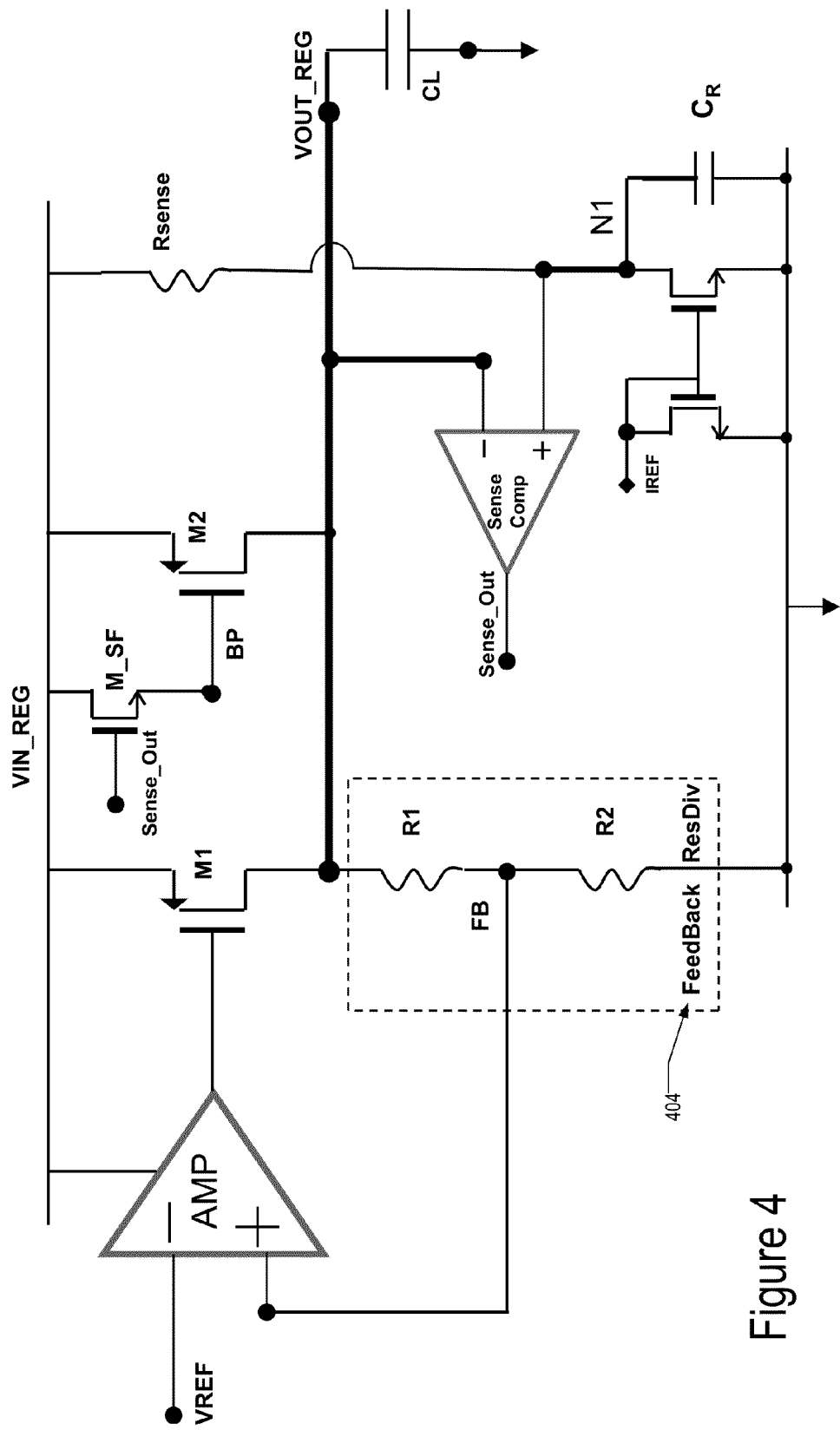
FIG. 4 is a linear regulator circuit with inrush current control.

FIG. 4 is a circuit with current control. The circuit in FIG. 4 may be designed to handle inrush current and includes a bypass mode. In particular, the bypass BP controls the inrush current of MOS M2. The input supply voltage is VIN_REG and the output voltage is VOUT_REG. The reference voltage is VREF and is supplied input into the amplifier AMP. The feedback node 404 includes two resistors R1, R2. The reference current source produces the current IREF. IREF may be mirrored and dropped across resistor Rsense. The resistor Rsense with reference current IREF generates a reference voltage VREF for the comparator Sense_Comp. The comparator Sense_Comp output is Sense_Out. The bandgap voltage may be a constant reference voltage generated from a band gap circuit which may be independent of process, temperature and supply voltage. The bandgap voltage may not be used as a reference since the bandgap is non-functional during bypass mode. In addition, it may not be easy to generate reference voltage VREF which is close to the input supply voltage VIN_REG. The reference voltage VREF is compared with the output voltage VOUT_REG. VDS is the drain to source voltage of the bypass mode transistor where there is a voltage drop across the transistor Ron. When the output/load current is higher than a limit (e.g. set by the resistor Rsense and the current IREF) the comparator output Sense_Out goes high and NMOS transistor N_SF may pull the gate of the bypass transistor high, which limits the load current.

When noise is present on the supply voltage VIN_REG, the "on" resistance of the bypass BP power MOS transistor and the load capacitor CL may produce a phase difference between input supply voltage VIN_REG and the bypass mode output voltage VOUT_REG. This phase difference may be handled as described below with respect to FIG. 4. The resistor Rsense and the capacitor $C_R$ may produce the phase difference between the input supply VIN_REG and the voltage at node N1. When the phase difference created at VOUT_REG and node N1 match, the comparator compares accurately. This phase co-relation may be disturbed as the inrush current kicks in at the VOUT_REG node, which changes the impedance ("on" resistance) created by the PMOS transistor M2 and as this changed impedance does not matches with impedance Rsense. Due to this impedance mismatch the voltage at the comparator inputs nodes may not remain in same phase and so comparator output may oscillate. The oscillation may switch the bypass BP power MOS device on and off. In addition, once the comparator goes high the reference level may need to change such that the normal condition is restored and power MOS M2 is activated when the inrush current is reduced and the load current comes in specification limit.

The bypass transistor M2 is activated for handling legacy devices. In particular, the BP signal becomes low, so the M2 transistor becomes active. In one example, the input may be 3.3V and the output may be 3V with a slight drop due to the Ron resistance of POWER MOS M2. In another example, if the resistance is half ohm, the current is 100 milliamps, and the VIN_REG is 3.3V then the VOUT_REG will be 3.25V. The 50 millivolt drop will be caused by the 100 milliamp current flowing through the half ohm resistance of bypass mode power MOS. The legacy product can function properly when VOUT_REG is close enough to the required voltage. In the example where VIN_REG is 3.3 volt, the resistance of the M2 transistor is 0.5 ohm, and the current in the normal case is 100 milliamps, there may be a voltage drop of 50 millivolts for the VOUT_REG node. The node of the Sense_Comp will be at 3.25V. The Rsense resistance may be selected such that node N1 is set to voltage level 3.2V. If the voltage level at VOUT_REG is higher than 3.2V (less than 100 millivolt drop rather than a 50 millivolt drop), the comparator Sense_Out signal will be zero and the NMOS M_SF will be switched off. If the current becomes 200 milliamps, and the resistance of the M2 transistor is 0.5 Ohms, then the comparator inputs becomes closer. The drop at VOUT_REG may be increased higher than 100 millivolts and the Sense_Out may trip and become high. When it becomes high, the gate of the transistor M_SF becomes high and it will pull up that the BP node to high. When node BP is pulled up, the power MOS M2 is switched off, so it is forcing less current.

Figure 5:
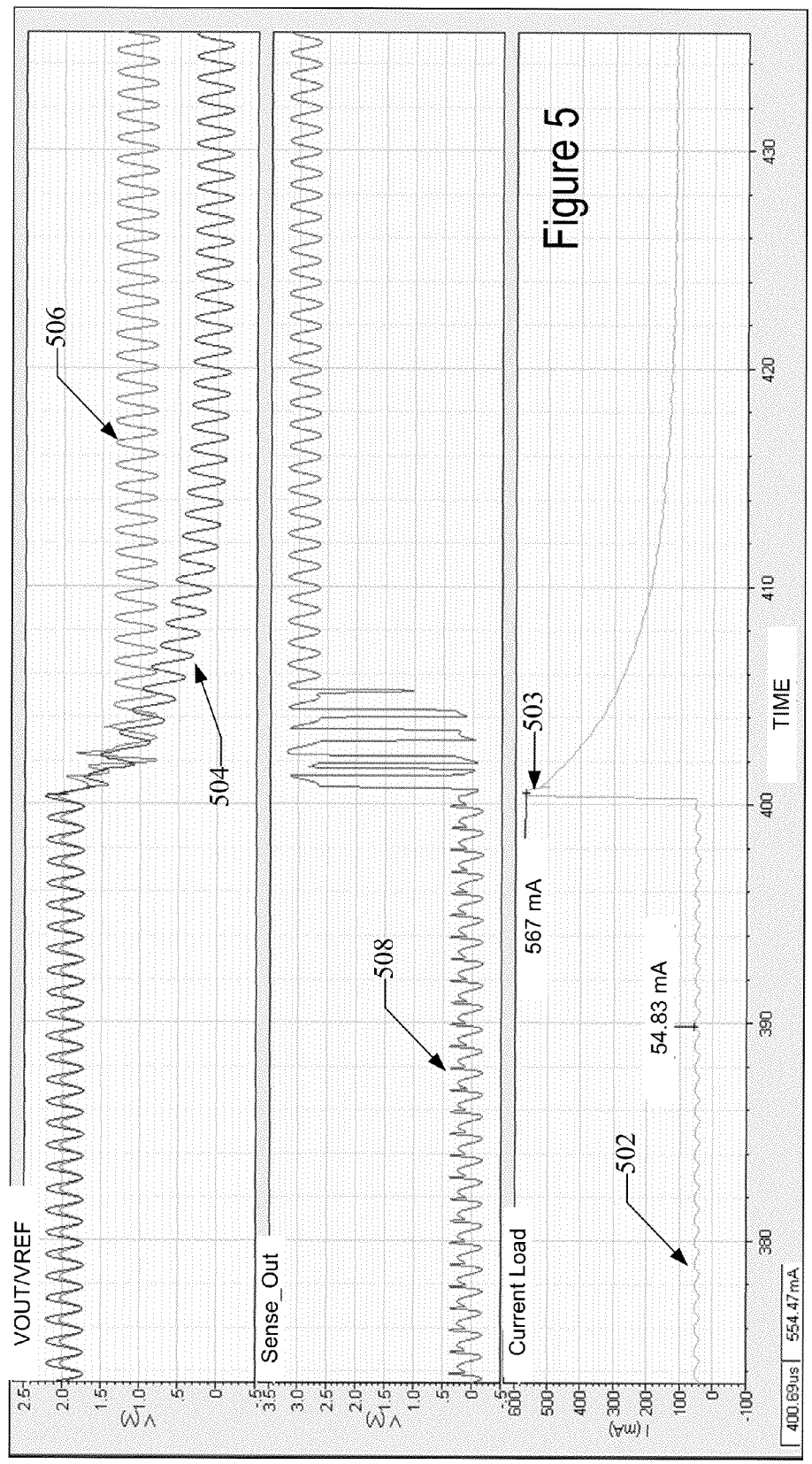
FIG. 5 is a diagram of simulation waveform for classical current control with input supply noise.

FIG. 5 is a simulation waveform diagram of current control with input supply noise. FIG. 5 illustrates current load 502, VOUT_REG 504, VREF 506, and Sense_Out 508 as a function of time. The VOUT_REG 504, the VREF 506, and the Sense_Out 508 are voltages as a function of time. The current load 502 illustrates the current as function of time. The input noise present on the VREF 506 shows up as noise on the VOUT_REG 504. As illustrated in FIG. 5, the current load 502 has a current spike 503 in which the current increases from 54 mA to 567 mA very quickly. As shown, the current spike 503 may exceed the current limit or regulator limit. The consequences of the spike 503 are shown in each of the VOUT_REG 504, the VREF 506, and the Sense_Out 508. The Sense_Out 508 is an output of the comparator. With a current limit of 200 milliamps, the Sense_Out 508 should be off when that limit is reached and it should stop supplying the additional current that is seen in FIG. 5. In the presence of noise, the Sense_Out 508 node can go up and down and it can make the bypass transistor turned on and off. Accordingly, FIG. 6 with FIG. 7 addresses the handling of the supply noise.

Figure 6:
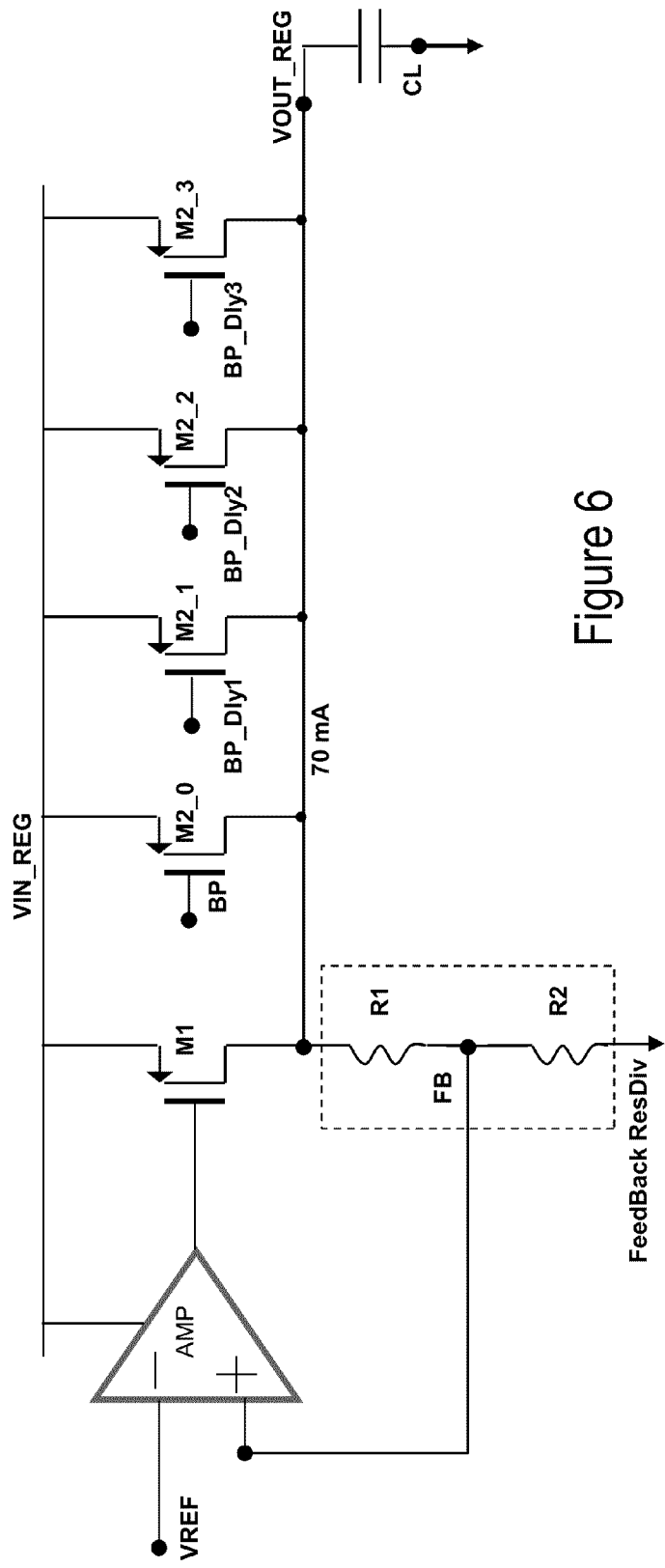
FIG. 6 is a bypass mode transistor with split control.

As discussed above, the phase difference described with respect to FIG. 4 may be addressed in the circuit shown in FIG. 6. FIG. 6 illustrates a linear regulator circuit with bypass mode transistor with split control. The circuit in FIG. 6 supports the current limit in bypass mode. In particular, the bypass power MOS may be split into multiple instances "M2_0", "M2_1", "M2_2" and "M2_3." In particular, the M2 MOS as part of the bypass mode in FIGS. 3-4 is split into four portions. There are four bypass signals BP, BP_Dly1, BP_Dly2, and BP_Dly3. The bypass signals allow the four bypass power MOS transistors to be switched on sequentially rather than all at once. In particular, these multiple instances are switched on with some delay during power on and so the initial power-on inrush current is controlled. In other words, switching on the M2_0, M2_1, M2_2 and M2_3 transistors one by one controls the POWER ON inrush current. When the input supply reaches ~0.6V the BP signal is turned LOW, after some delay based on the delay provided by the delay blocks ~20 uS, 40 uS and 60 uS, the Power MOS transistors M2_1, M2_2 and M2_3 are switched ON sequentially.

Figure 7:
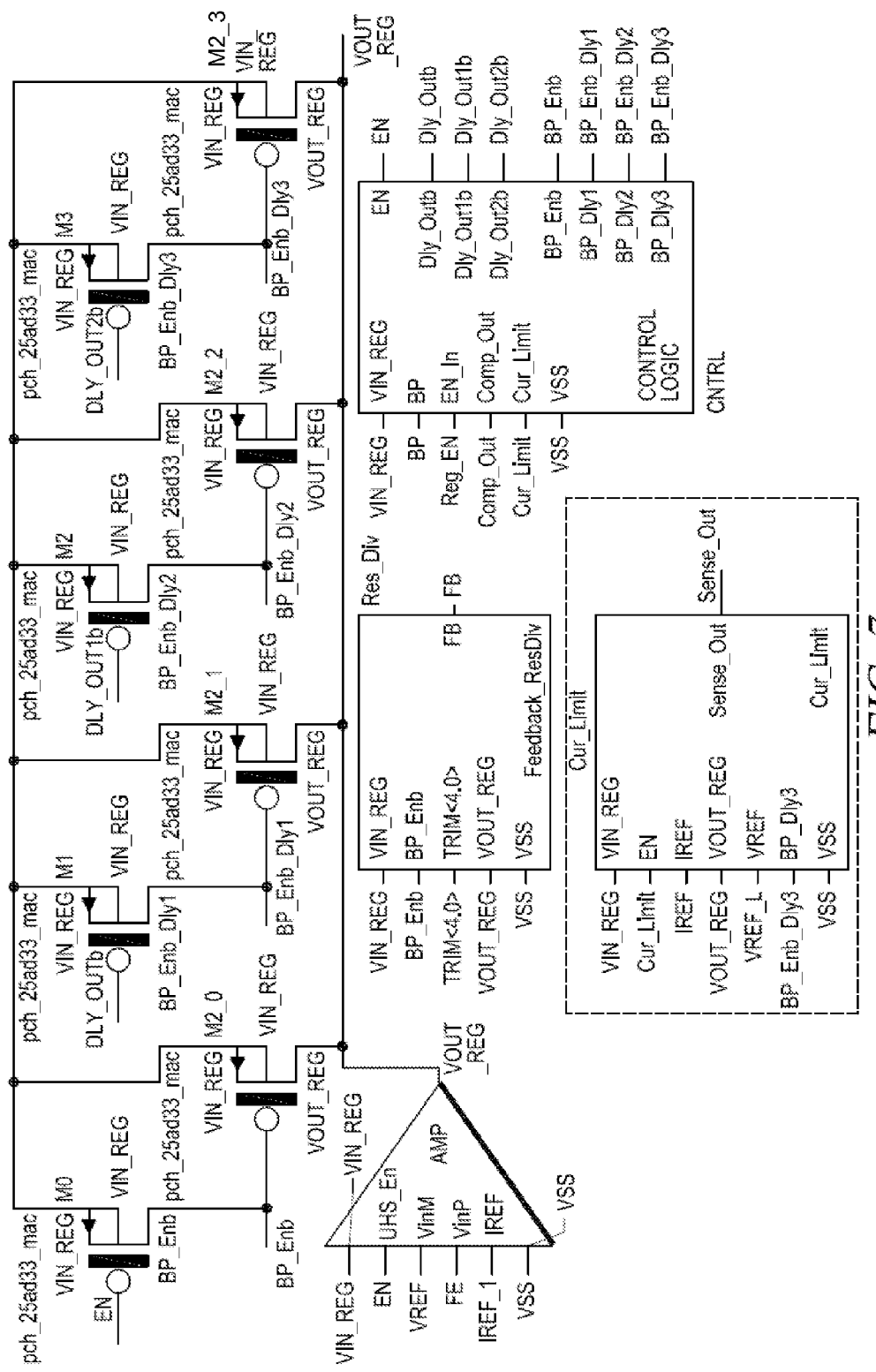
FIG. 7 is diagram of a bypass mode transistor with split control and current limit block.
Figure 8:
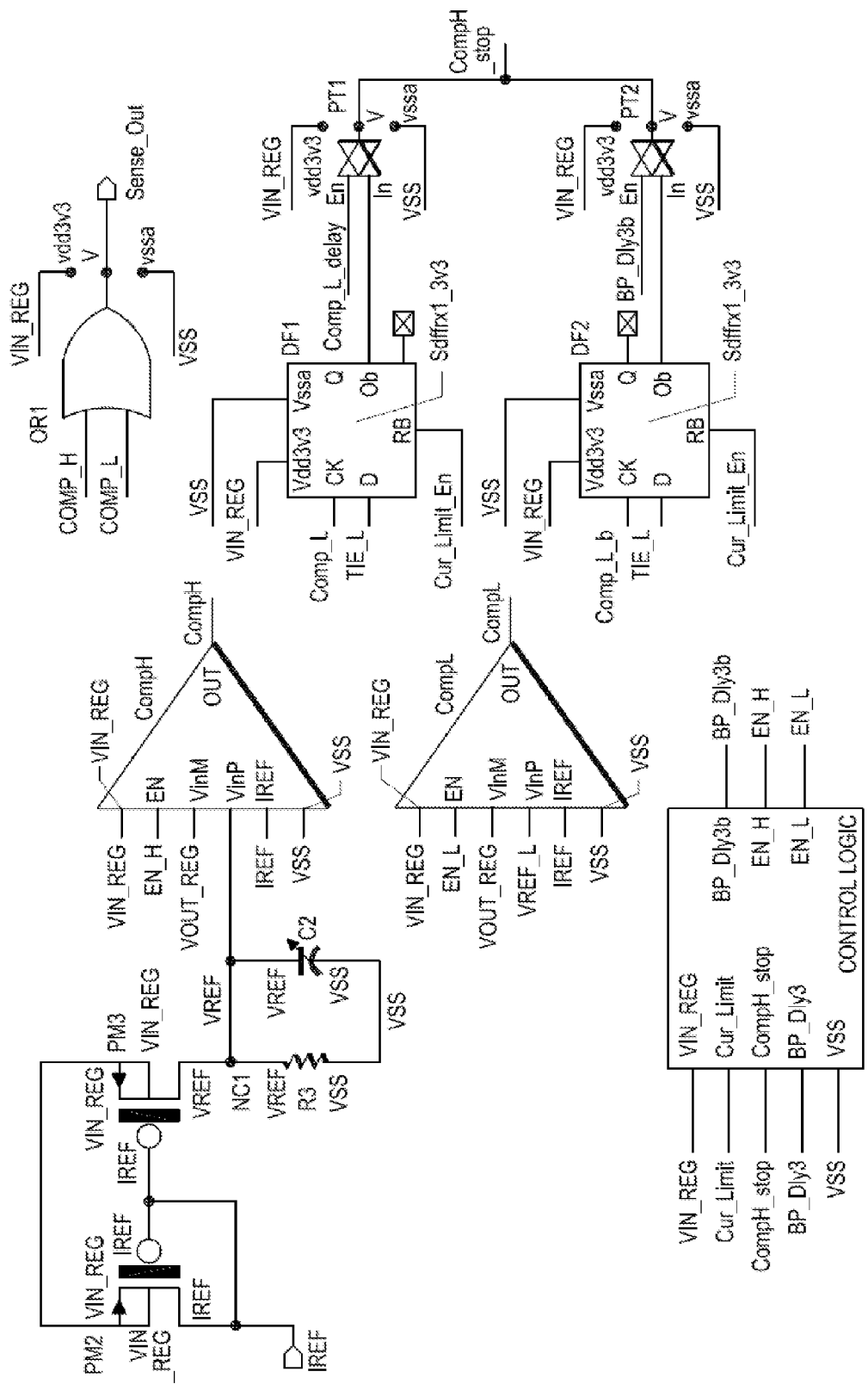
FIG. 8 is a current limit control circuit in the presence of supply noise.

FIG. 7 is a bypass mode transistor with split current limit control. In particular, FIG. 7 shows Bypass MOS and regulator mode together with different sub-blocks required during the Bypass and regulated operation, like feedback resistor divider, control logic and current limit control block "Cur_Limit." The detail of the current limit circuit/block Cur_Limit is provided in FIG. 8. FIG. 8 illustrates two comparators that are being used: "CompH" and "CompL." In addition, FIG. 8 illustrates two flip-flops DF1, DF2 and two pass transistors logic PT1 and PT2.

When noise is present on the supply, the same noise remains present on node NC1. Generally the impendence of the current source PM3 is matched with Capacitor C2 such that the phase difference between the supply noise and VOUT_REG is the same as between the supply noise and node NC1. This results in the signals at the input of comparator CompH being in the same phase. When the inrush current appears on the VOUT_REG node, the comparator output goes high. Once the output of the comparator CompH goes high, the power MOS M2_1, M2_2 and M2_3 are switched OFF. When the inrush current is higher and the last three POWER MOS are off, the VOUT_REG node discharges sufficiently low (below the threshold of CompL) such that comparator CompL turns ON and the comparator CompH is turned off. The turning off of CompH process ensures that, due to phase difference change between supply noise and the VOUT_REG node, the output of the comparator CompH does not start oscillating. Accordingly, the reference of comparator CompH does not need to change since the return to normal mode during lower inrush current is measured by comparator CompL. Since the power MOS M2 is split into multiple parts, the last three parts M2_1, M2_2, and M2_3 may be switched off while the first part M2_0 remain on. Since the current supplying strength of the first power MOS M2_0 is less and cannot supply the current required for the inrush, the voltage at the VOUT_REG node drops to balance the maximum possible current (e.g. ~125 mA) the first power MOS M2_0 can supply.

Compared with a single comparator as in FIG. 4, both inputs to the comparator Sense_Comp may include noise (which are not in phase) which may cause it to trip up and down. The comparator CompH compares a NC1 signal created by IREF signal with the VOUT_REG. The modified IREF may be an inverted version of the IREF present for comparator Sense_Comp shown in FIG. 4. When comparator CompH goes high, the BP_Delay signals are disabled, which switches off M2_1, M2_2, and M2_3. If the output tries to pull a high amount of current at the CL node, the M2_0 is not able to provide that current and the VOUT_REG voltage will drop. When Comp_H goes high, comparator CompH is disabled using one of the D flip-flops and the PASStransistor PT1 and the OR1 gate, but comparator CompL is enabled. Previously, the High output for comparator CompL is set so as long as the VOUT_REG voltage remains low. If the current is no longer drawn, VOUT_REG will start increasing actually and the impedance will start increasing there and then slowly the VOUT_REG will go higher than the VREF L, comparator Comp_L output trips Low. Once the current limit goes lower, then one at a time the M2_1 and M2_2 and M2_3 are switched on.

In other words, if a higher current is drawn, the high comparator CompH output goes high and switches off M2_1 and M2_2 and M2_3. The next comparator CompL has a limit that once the CompL goes high, it switches off the CompH. In the return path when current limit goes lower output of comparator CompL trips Low and switches the power MOS M2_1, M2_2 and M2_3, ON. Once the last POWER MOS M2_3 is turned ON it switches to enable the comparator CompH because now the initial conditions are established.

Figure 9:
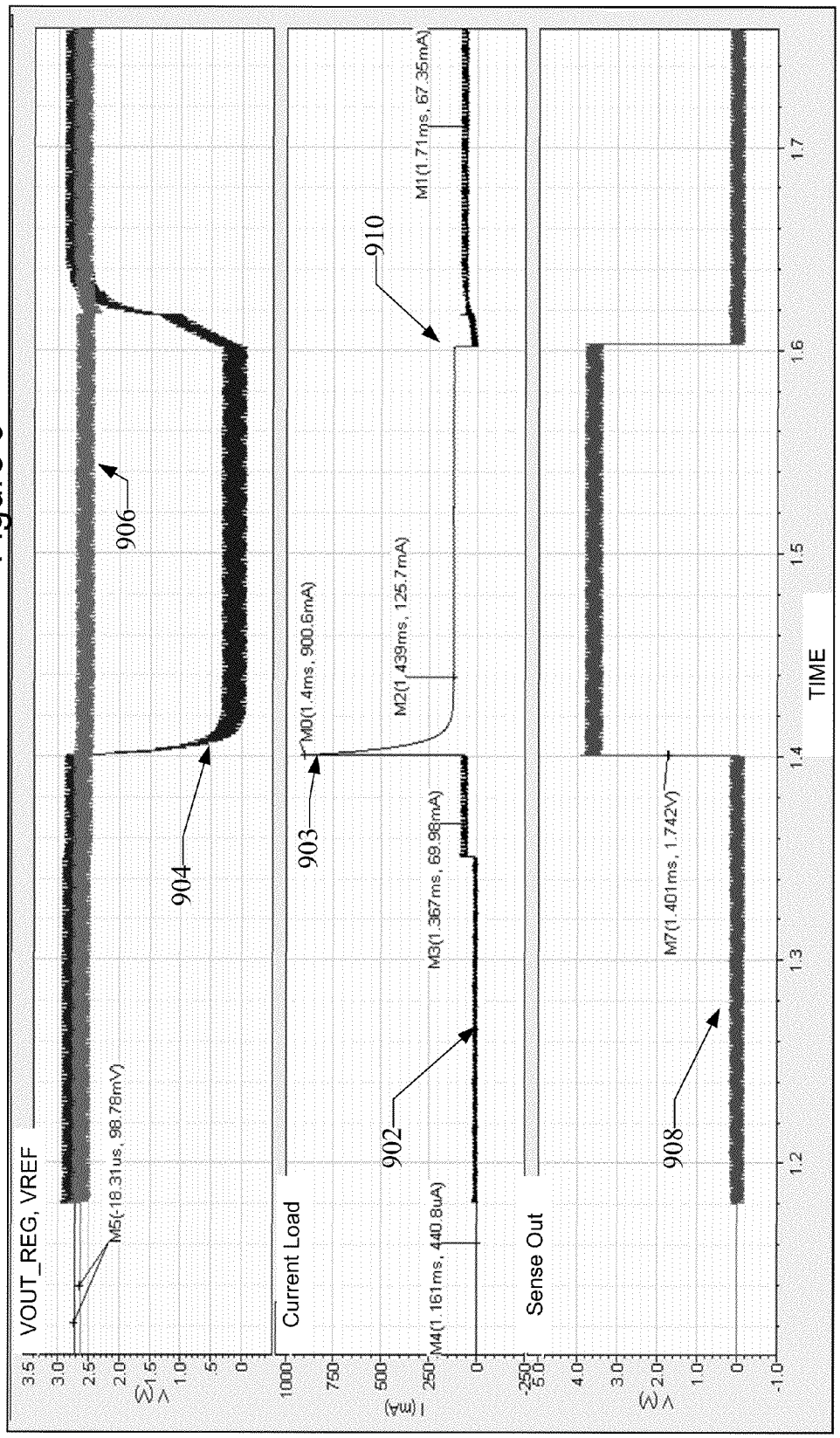
FIG. 9 is a diagram of simulation results of proposed current limit control.

FIG. 9 is a diagram of simulation results of proposed current limit control with input supply noise using the circuit of FIG. 8. FIG. 9 illustrates current load 902, VOUT_REG 904, VREF 906, and Sense_Out 908 as a function of time. The VOUT_REG 904, the VREF 906, and the Sense_Out 908 are voltages as a function of time. FIG. 9 illustrates a spike 903 in current load 902 and displays the response from VOUT_REG 904, the VREF 906, and the Sense_Out 908 to that spike 903. The spike 903 may be caused by an inrush current. VOUT_REG 904 drops to correspond with the inrush current and when the inrush current returns to normal 910, the VOUT_REG 904 voltage rises back to be comparable to the VREF 906 voltage value. Sense_Out 908 remains high during the entire inrush current scenario and does not return lower until the inrush current finishes and the current returns to normal. The operation between the inrush current 903 and 910 may be referred to as current limit operation in which the load current is higher than the BYPASS mode regulator current limit. When the inrush current 903 is present, the split of the power MOS M2 (M2_1 and M2_2 and M2_3) are disabled until the inrush current finishes 910, at which time the comparator CompL releases M2_1 and M2_2 and M2_3 one by one. Once the last unit M2_3 is turned on, the comparator CompH is turned on to track the next inrush current phenomenon. This current limit circuit functions in the presence of the supply noise and controls the inrush currents in bypass mode regulators.

A "computer-readable medium," "machine readable medium," "propagated-signal" medium, and/or "signal-bearing medium" may comprise any device that includes, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium. A non-exhaustive list of examples of a machine-readable medium would include: an electrical connection "electronic" having one or more wires, a portable magnetic or optical disk, a volatile memory such as a Random Access Memory "RAM", a Read-Only Memory "ROM", an Erasable Programmable Read-Only Memory (EPROM or Flash memory), or an optical fiber. A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

We claim:

1. A method for operating a voltage regulator comprising:
activating a bypass mode for the voltage regulator, wherein the bypass mode operates at a different voltage than a regulating mode;
utilizing a plurality of bypass power transistors during bypass mode;
controlling current during the bypass mode with a current control circuit of the voltage regulator, wherein an inrush current is controlled by the current control circuit by splitting the bypass power transistors with a delay during a power on; and
utilizing a first comparator and a second comparator from the current control circuit for handling supply noise, wherein a noise input to the first comparator is not in phase with a noise input to the second comparator, and the bypass power transistors are triggered by the first and second comparators depending on a comparison of the noise inputs to the comparators.

2. The method of claim 1 wherein the bypass mode is operated for devices at a higher voltage than devices for the regulating mode.

3. The method of claim 2 wherein the bypass mode is enabled for legacy devices.

4. The method of claim 3 wherein non-legacy devices operate at regulating mode rather than bypass mode.

5. The method of claim 1 wherein the plurality of bypass power transistors comprises four metal oxide semiconductor ("MOS") bypass transistors.

6. The method of claim 1 wherein the supply noise is present due to a higher parasitic from a host device.

7. The method of claim 1 wherein the current control circuit is designed to handle the inrush current in presence of input supply noise.

8. The method of claim 1 wherein the voltage regulator comprises a linear regulator.

9. A voltage regulator comprising: a bypass mode circuit comprising a plurality of bypass power transistors that are configured to reduce an inrush current by switching on each of the bypass power transistors sequentially with a delay during a power on; and a current limit circuit comprising a first comparator and a second comparator that prevent supply noise from disrupting the voltage regulator, wherein a noise input to the first comparator is not in phase with a noise input to the second comparator, further wherein when a higher current is drawn, the first comparator is high and switches off the bypass power transistors and when the second comparator is high, the first comparator is switched off, wherein when a lower current is output, the second comparator is low and switches on the bypass power transistors which triggers the first comparator.

10. The voltage regulator of claim 9 wherein the plurality of bypass power transistors in the current control circuit comprises four bypass power metal oxide semiconductor ("MOS") transistors.

11. The voltage regulator of claim 10 wherein the four bypass power MOS transistors control the inrush current during a bypass mode operation of the voltage regulator.

12. The voltage regulator of claim 9 wherein the bypass mode circuit further comprises an amplifier and a feedback circuit.

13. The voltage regulator of claim 9 wherein the bypass mode circuit is operated for devices at a higher voltage than devices with a regulating mode.

14. The voltage regulator of claim 9 is configured to operate as a linear regulator.

15. A method for a circuit controlling noise on a supply line comprising:
activating, on a linear voltage regulator, a bypass mode that operates for devices at a higher voltage than a regulating mode;
utilizing, during bypass mode, a plurality of bypass power transistors as part of the circuit that are configured to reduce an inrush current by splitting the bypass power transistors;

controlling current during the bypass mode with a current control component of the circuit, wherein the inrush current is controlled by the current control component by switching on each of the bypass power transistors sequentially with a delay during a power on; and utilizing two comparators from the current control component for controlling the noise from the supply line, wherein a noise input to the first comparator is not in phase with a noise input to the second comparator, and the bypass power transistors are triggered by the first and second comparators depending on a comparison of the noise inputs to the comparators.

16. The method of claim 15 wherein the bypass mode is triggered when a host comprises a device at a higher voltage than devices with the regulating mode.

17. The method of claim 16 wherein the bypass mode is enabled for legacy devices.

18. The method of claim 15 wherein the plurality of bypass power transistors comprises four metal oxide semiconductor ("MOS") bypass transistors.

19. The method of claim 15 wherein the supply noise is present due to a higher parasitic from a host device.

20. The method of claim 15 wherein the current control component is designed to handle the inrush current in presence of input supply noise.

* * * * *